July 28, 1931. Z. R. EVERETT ET AL 1,816,425
STERILE CONTAINER FOR CLINICAL THERMOMETERS
Filed March 1. 1929
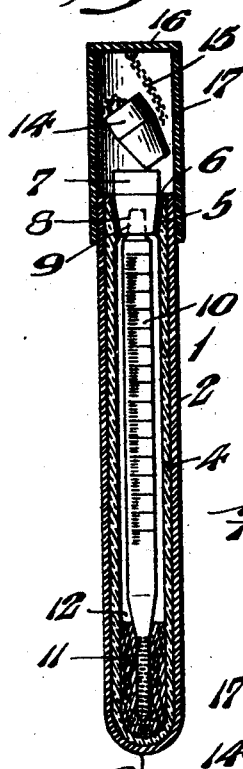
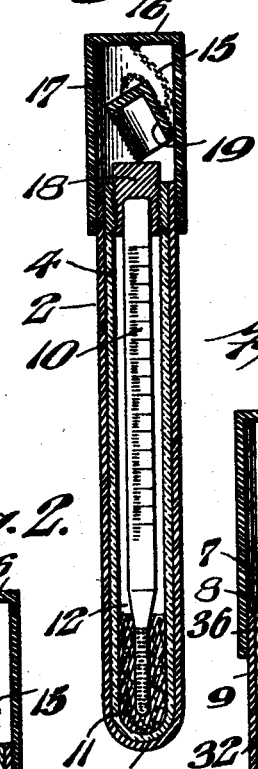
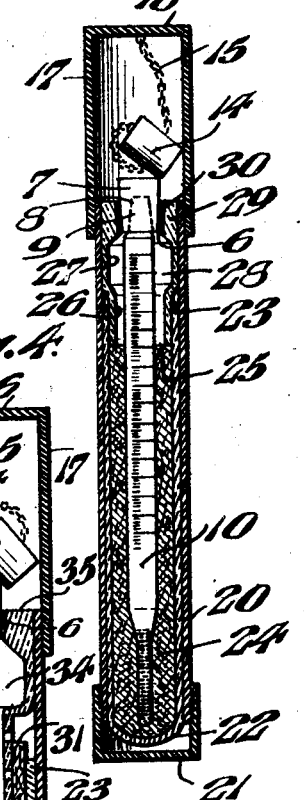
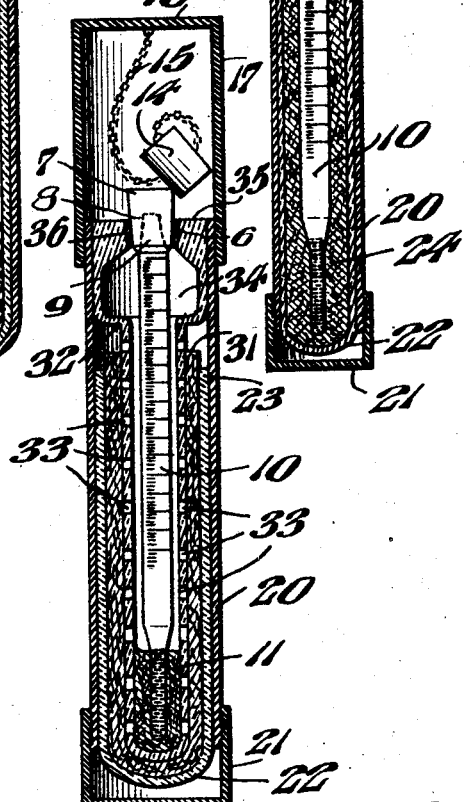
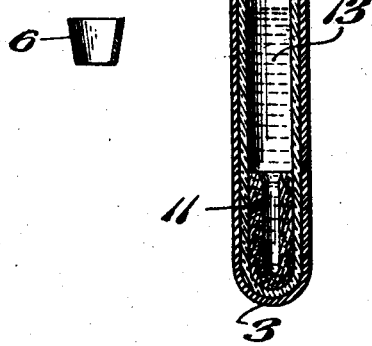
INVENTORS
ZELMA R. EVERETT,
KARL F. V. NYGAARD,
BY
ATTORNEYS.

Patented July 28, 1931

1,816,425

UNITED STATES PATENT OFFICE

ZELMA R. EVERETT AND KARL F. V. NYGAARD, OF PHILADELPHIA, PENNSYLVANIA

STERILE CONTAINER FOR CLINICAL THERMOMETERS

Application filed March 1, 1929. Serial No. 343,750.

Our invention relates to a new and useful sterile container for clinical thermometers used by physicians, nurses, and patients, whereby the thermometer is constantly and automatically sterilized throughout its entire length or area and rendered ready for instant use.

It is well known that every physician, whether at a clinic or whether visiting patients at their homes, carries one or two thermometers that are used on all patients, irrespective of their diseases, said thermometers being sterilized after use on each patient, usually by washing in water, and replaced in a conventional holder or container. The disadvantages resulting from this practice are numerous since the air, as well as the thermometer container, are not sterile, and the thermometer, although sterilized after use by one patient, is nevertheless not fit for use on a subsequent patient, unless again thoroughly sterilized before such subsequent use. It is thus necessary, in order to be perfectly sanitary, thoroughly to sterilize the thermometer immediately after and before each use or application. Due to the fact that suitable germicides are not always available, doctors and nurses often limit the sterilizing operation merely to washing the thermometer in water with or without soap. This method of sterilizing a thermometer is admittedly insufficient and dangerous. For the physician or nurse to carry a germicide around for use before and after each application of the thermometer is cumbersome and inconvenient, and on this account the necessary sterilizing is very often neglected. A further disadvantage resides in the fact that when a thermometer is kept for home use, and is being used for the time being by a single patient, it is hardly ever sterilized due to the ignorance of the public and their assumption that as long as the thermometer is used by the same person it need not be repeatedly sterilized. In fact, however, (and discounting for the moment the infection of the thermometer resulting from contact with the surrounding air and with its container) it is very necessary to sterilize the thermometer before use by the same person, since it is possible for a person to reinfect himself and bring on a relapse, by introducing into his system a fresh dose of the germs causing the particular disease, after such person shall have partly or completely recovered from such disease.

It is therefore the object of our invention to provide a novel sterilizing container for clinical thermometers whereby the latter are constantly and automatically sterilized without any attention on the part of the doctor, the nurse, or the patient, thus guarding against possible infection due to neglect, forgetfulness, carelessness, or ignorance.

It is a further object of our invention to provide means for constantly and automatically sterilizing the entire length or area of the thermometer without the necessity of carrying or otherwise providing a germicide and without the expenditure of any time or effort on the part of the user.

To the above ends, our invention consists of a thermometer container comprising an outer protecting casing of any suitable construction, an inner casing adapted to contain a germicide and to receive the thermometer, and enclosures for the upper ends of said outer and inner casings. Our invention further consists in forming on or attaching to the upper end of the thermometer, a stopper adapted to close the mouth of the germicide container. It further consists of an auxiliary stopper contained in or attached to the cap of the outer casing, for use when the thermometer is removed from its casing, to prevent loss of the germicide.

Our invention further consists of various modifications or embodiments designed and intended for carrying out the principal object of our invention which is to maintain the entire length of the thermometer constantly immersed in or in contact with a suitable germicide whenever such thermometer is not in actual use.

For the purpose of illustrating our invention we have shown in the accompanying drawings forms thereof which are at present preferred by us, since the same have been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the accompanying drawings:

Fig. 1 represents a longitudinal, vertical sectional view of a thermometer container embodying our invention, the thermometer being shown in elevation.

Fig. 2 represents a view similar to that shown in Fig. 1, with the thermometer removed for use.

Figs. 3, 4, and 5 represent sectional views similar to Fig. 1, showing some of the possible modifications of our invention.

Fig. 6 represents a sectional view of a bushing employed.

Similar numerals of reference indicate corresponding parts.

Referring first to Figs. 1 and 2, 1 designates our novel construction of sterile container for clinical thermometers, the same comprising an outer casing 2 closed at its bottom 3 and open at its top and provided with an inner receptacle 4 preferably of glass, also closed at its bottom and open at its top and fitted snugly within said outer casing, which latter may be of hard rubber or the like. The upper end of the inner glass container has a conical mouth 5, within which is fitted a conical sleeve or bushing 6 of cork or the like, within which is fitted a conical head or stopper 7 having a seat 8 at its bottom within which is seated, fitted, or secured the upper reduced end 9 of the clinical thermometer 10, whose lower end is seated in the felt or the like 11, in the bottom of the chamber 12 which contains a fluid germicide or sterilizing substance or medium 13, which fills the chamber 12 to about the extent shown in Fig. 2, when the thermometer is withdrawn for use, so that when the thermometer is reinserted into the chamber 12 the level of the germicide 13 rises to the top of the chamber 12, to cover or surround the entire body of said thermometer. The stopper 7 may be secured to or loose from the extension 9, the function of said stopper being to prevent the escape of the germicide, when the parts are assembled as seen in Fig. 1. When it is desired to use the thermometer 10, the stopper 7 and the thermometer 10 are withdrawn and the stopper 14, secured by the chain or connection 15 to the top 16 of the cap 17, is pushed into the bushing 6, so that the parts appear as seen in Fig. 2, whereby the germicide 13 is prevented from escaping. The cap 17 may also be of hard rubber or the like and may have a sliding fit with the top of the casing 2, or may be screwed or otherwise secured thereto. The construction seen in Fig. 5 is substantially the same as already described, except that the stopper 18 is screw threaded so as to screw into place, as is the auxiliary stopper 19 carried by the casing cap, all the other parts being as already described.

In the construction seen in Figs. 3 and 4 the outer casing may be formed of an open ended tube 20, having the bottom cap or closure 21 threaded thereto and the upper cap 17 provided with the auxiliary stopper 14 connected to the upper cap as already described. In Fig. 3, we have shown the inner glass container 22 as terminating at the point 23, and containing the felt, wicking, or the like 24, which terminates at the point 25, below the point 23. 26 designates an upper sleeve like glass bushing whose lower end rests upon the upper edge 25 of the felt or wicking 24 and is telescoped within the upper end of the glass container 22 and enlarged at 27 to form the chamber 28 for the reception of the germicide which may or may not be employed. The upper end 29 of the bushing 26 is thickened and has a conical mouth 30 within which is fitted the cork bushing 6 of the same character as that already described. The stopper 7 seen in Fig. 3 may be cemented to or made integral with the extension or top end 9 of the thermometer, as already explained, so that said thermometer 10 and stopper 7 can be withdrawn as a unit. The germicide contained in the chamber 28 will obviously saturate the entire length or extent of the felt or wicking 24, as is evident, so that the entire length of the thermometer will be disinfected, which is true of all the embodiments of our invention.

In the construction seen in Fig. 4 we have employed a glass container 22, having its top terminating at about the point 23, as already described, within which is a cylinder of absorbent material 31 which is held in place by the inner glass cage 32 having the ports or perforations 33 therein. The upper portion of the cage 32 is widened to form the chamber 34, above which is the thickened wall 35 having the conical mouth 36 for the cork bushing 6, already described, which receives the stopper element 7, which may be separate from or secured to or integral with the thermometer, as already described. In all the embodiments of our invention seen in Figs. 1, 2, and 5, the space or chamber surrounding the thermometer is filled with the germicide, as formaldehyde or the like, so that when the thermometer is immersed therein, the entire length thereof is subjected to the germicide and effectively sterilized.

We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having thus described our invention, what we claim as new, and desire to secure by Letters Patent, is:

1. The combination of a thermometer having an upper conical head serving as a stopper, a germicide container enclosing said thermometer and having an upper conical mouth engaged by said stopper, an outer casing enclosing said container and thermometer, a cap for said outer casing, and an auxiliary stopper carried by the cap of said outer casing for closing the mouth of said germicide container when the thermometer is withdrawn from said container.

2. In a device of the character stated, a thermometer having an upper head forming a stopper, a germicide container adapted to receive said thermometer and having an upper mouth adapted to be closed by said stopper, an outer casing enclosing said container and thermometer, a cap for said outer casing, an auxiliary stopper permanently secured to said cap within the interior thereof, for closing the mouth of said germicide container when said thermometer is withdrawn from said container, and cushioning means in the bottom end and the upper mouth of said germicide container engaging the bottom and upper portions of said thermometer to prevent breakage of the latter.

3. In a device of the character stated, a thermometer having an upper head forming a stopper, a perforated container adapted to receive said thermometer and having an upper mouth adapted to be closed by said stopper, and outer casing enclosing said container and thermometer, a cap for said outer casing, an auxiliary stopper permanently carried by said cap in the interior thereof for closing said mouth when said thermometer is withdrawn from said container, and an absorbent pad saturated with a germicide positioned between said perforated container and said outer casing.

4. In a device of the character described in combination a casing, a detachable insertable container within said casing, said container having at one end an orifice having a flared diverging mouth serving as a seat for a stopper and as a means for hermetically sealing a thermometer within said casing, a cap detachably secured to the exterior of said casing, and an auxiliary stopper permanently secured to and forming a part of said cap.

5. A device of the kind described comprising in combination a casing, a cap closing the bottom of said casing, a liquid receiving container insertably mounted within said casing, a lining of fibrous material within said container, a thermometer insertable within said container and said fibrous material, said thermometer being sealed within said casing by a bushing mounted in a flared mouth formed integral with said container, a cap threadedly secured to an upper part of said casing, and an auxiliary stopper permanently secured to and forming a part of said cap, said stopper serving to seal liquid within said container when said thermometer has been withdrawn therefrom.

ZELMA R. EVERETT.
KARL F. V. NYGAARD.